Jan. 15, 1952     R. W. BORDEWIECK ET AL     2,582,676
CATHODE FOLLOWER PHOTOELECTRIC AMPLIFIER CIRCUIT
Filed Aug. 6, 1949
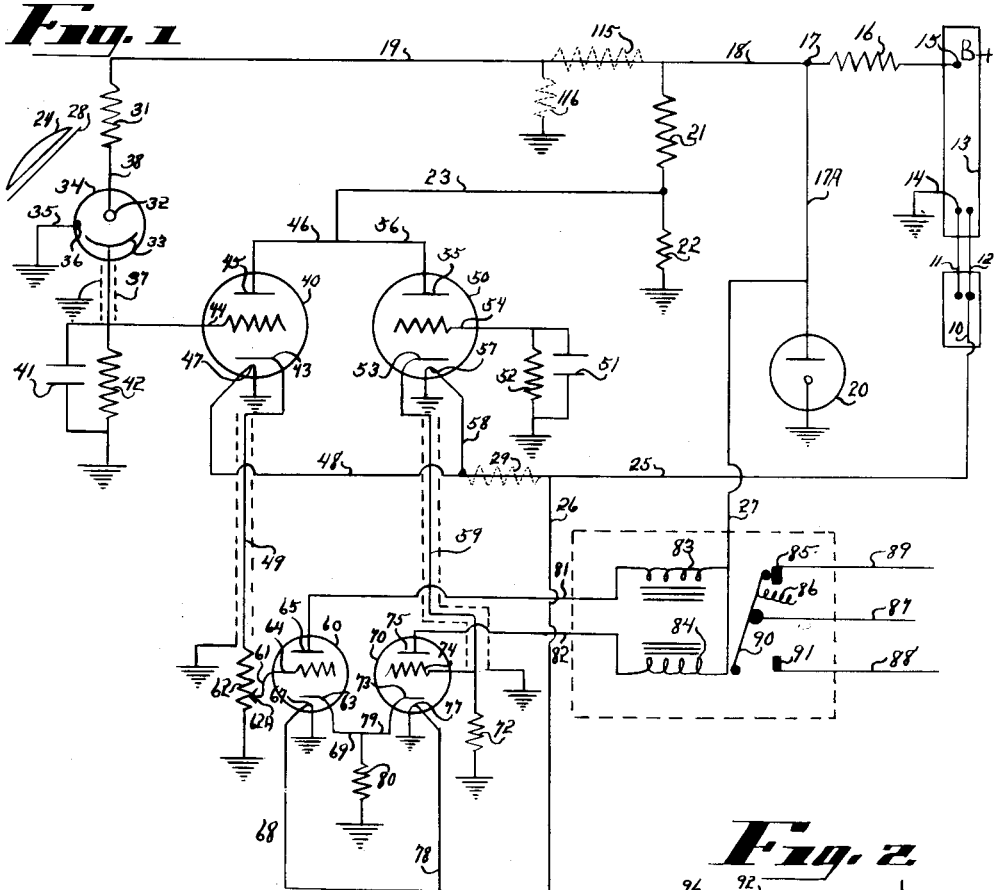
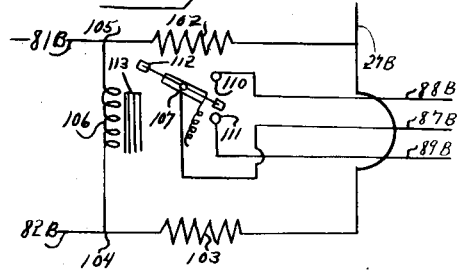
INVENTORS
R.W. BORDEWIECK, J.O. ROEBUCK, +
BY N.M. SLEEPER Patented Jan. 15, 1952

2,582,676

UNITED STATES PATENT OFFICE 2,582,676

CATHODE FOLLOWER PHOTOELECTRIC AMPLIFIER CIRCUIT

Robert W. Bordewieck, Southboro, James O. Roebuck and Neal M. Sleeper, Worcester, Mass., assignors to Moore Electronic Laboratories, Incorporated, Worcester, Mass., a corporation of Massachusetts Application August 6, 1949, Serial No. 108,977

3 Claims. (Cl. 175—321)

The principal object of this invention is to provide an improved circuit for use in detecting and amplifying extremely low intensity light radiations, both visible and invisible.

Whereas, most investigators have found that so-called phototube dark current and drift in phototube sensitivity, make it impossible to detect and amplify extremely low levels of illumination without first either chopping the light signal by means of a motor or vibrator driven signal interrupter, or by the use of a modulated light source, our system eliminates the need for any of these. By employing special guard circuits, special types of amplifying and phototubes, and a specially balanced amplifier circuit with a special relay as a detector and a lens to increase the light signal on the phototube, we have been able to detect light intensities easily, which hitherto required special delicate precision laboratory equipment. While our circuit and equipment require special components, these components are readily available.

Other objects and advantages of the invention will appear hereinafter.

Reference is to be had to the accompanying drawings, in which

Fig. 1 is a diagram of a circuit for the detection and measurement of low light intensities;

Fig. 2 is a diagram of an alternative relay detector circuit; and

Fig. 3 is a further modification thereof.

Referring to Fig. 1, our circuit for detection and measurement of low light intensities comprises a source of electrical energy at 10 connected as by lines 11 and 12 to a high voltage rectifier 13. If the source of electrical energy used is a battery, at 10, it is necessary to use a vibrator and transformer at 13 to produce high voltage A. C. which is then rectified. If a low voltage A. C. source is used at 10, a transformer is needed at 13 to increase this voltage before it is rectified; if a low voltage D. C. battery is used at 10, a dynamotor may be used at 13 to produce high voltage D. C. In any case, the negative connection of rectifier 13 is grounded as by line 14 and the high voltage terminal 15 is connected as by resistor 16 to point 17. A voltage regulator tube 20 is connected from point 17 to ground by line 17A. Resistor 16 serves as a ballast resistor for tube 20.

The pick-up circuit consists of a protective resistor 31 connected by lines 19 and 18 to point 17 and by line 38 to the anode 32 of a phototube 34. The cathode 33 of phototube 34 is connected as by ground shielded line 37 to the grid 44 of a tube 40. The envelope shield 36 of phototube 34 is connected by line 35 to ground. Grid 44 is connected through resistor 42 and condenser 41 to ground. The plates 45 and 55 of tubes 40 and 50 respectively are connected by lines 46 and 56 respectively to a line 23 and thence to the junction point on the voltage divider consisting of resistors 21 and 22. Resistor 21 connects to line 18 and thence to point 17. Resistor 22 connects to ground. Grid 54 of tube 50 is connected as by resistor 52 and condenser 51 to ground. Heaters 47 and 57 of tubes 40 and 50 respectively, are connected at one end to ground and at the other end by means of lines 48, 58, and 25 to the source of electrical energy 10. Cathodes 43 and 53 are connected as by ground shielded lines 49 and 59 to the resistors 62 and 72, connected in the grid circuits of tubes 60 and 70. Resistor 72 connects directly from grid 74 of tube 70 to ground. Resistor 62 is a potentiometer, the moving contact 62A thereof being connected by line 61 to grid 64 of tube 60. The heaters 67 and 77 of tubes 60 and 70 respectively are connected by one end to ground and by the other end through lines 68 and 78 and lines 26 and 25 to the source of electrical energy 10.

Cathodes 63 and 73 are connected as by lines 69 and 79 to resistor 80 and thence to ground. Plates 65 and 75 are connected as by lines 81 and 82 to the detecting relay network provided and thence by line 27 to the anode of voltage regulator tube 20.

Three options are provided for this detecting network. In Fig. 1, the detecting network option chosen is a differential relay with two coils 83 and 84, with a common centrally pivoted armature 90, there being a spring 86 adjusted to hold the armature against contact 85, with no current through the coils 83 and 84. If the current through the coil 84 is more than that through coil 83, its force aids the spring 86 and continues to hold armature 90 on contact 85. If the current through coil 83 is greater than that of coil 84, armature 90 is pulled against the force of the spring 86 and armature 90 closes against contact 91. Effectively, the amount of illumination striking the phototube controls the single pole double throw switch, consisting of the armature 90 and contacts 85 and 91, thus enabling the signal to open or to close a circuit between lines 87 and 89 or 87 and 88.

The operation of the circuit for Fig. 1 is as follows: With no light striking the phototube 34, no current will flow through that tube and effectively grids 44 and 54 are connected to ground through equal resistors 42 and 52 respectively. The plates of the cathode follower tubes 40 and 50 are connected to a low voltage tap (6 to 10 volts D. C.) at the junction point between resistors 21 and 22. The cathodes 43 and 53 of the cathode follower tubes 40 and 50 respectively are connected through resistors 62 and 72 respectively to ground and with no signal applied, sufficient voltage will be developed across resistors 62 and 72 to self-bias the tube 40 and 50 with a slight negative voltage (approximately 1 volt). This voltage developed from cathode to ground of the cathode follower tubes 40 and 50 is applied to the grids of the amplifier stage tubes 60 and 70 is applied to the grids of the amplifier stage tubes 60 and 70 as a positive voltage. This positive voltage from grid to ground causes an appreciable amount of plate current in both tubes 60 and 70, which plate currents running through common cathode resistor 80, proceed to develop sufficient self-bias to limit those plate currents and thereby set the quiescent operating plate currents of tubes 60 and 70.

It is desirable that the current through tube 60 be slightly less than that of tube 70 so that armature 90 will be held by the spring, as well as by the means of the relay coils 83 and 84 onto contact 85. This is accomplished by decreasing slightly the positive voltage applied to grid 64 by means of the potentiometer slides 62A. When light is focused through lens 24 onto phototube cathode 33, current passes through the phototube and resistor 42 to ground, putting a positive signal on grid 44. Lens 24 is so designed as to give the phototube a view angle of about 15 degrees as well as increase the sensitivity of the phototube. This increases the plate current through tube 40 but does not effect that through tube 50. The increased current through tube 40 flows through resistor 62 to ground, increasing the positive voltage applied to grid 64 and thereby increases the plate current through coil 83. This increased current through coil 83 causes armature 90 to be pulled against the force of spring 86 from contact 85 onto contact 91, thereby switching the circuits upon the application of a light signal. If the plate current through tube 60 increases, the current through resistor 80 increases, which increases the self-bias on both tubes 60 and 70 somewhat. This increased bias is always less than the increased voltage applied from contact 62A to ground, but it has the effect of decreasing the current through tube 70.

That is, taking the circuit from cathode 63 through resistor 80, through resistor 62 to grid 64, an increase in light signals causes the voltage to become more positive in spite of the increased current through resistor 80; whereas taking the circuit from cathode 73 through resistor 80 and resistor 72 to grid 74, grid 74 becomes more negative because of the increased voltage drop across resistor 80. The voltage across resistor 72 remains constant with or without a light signal as it is not connected to the phototube. Thus it is seen that an increase in light signal increases the current through coil 83 and decreases the current through coil 84, causing a differential shift of the currents.

The advantages of the circuit are that high resistance may be used at 42 and 52, thus providing a much larger input impedance for a very small level of illumination. This signal input to the cathode follower is decreased slightly by the cathode follower but its impedance is reduced from, say 100 megohms down to ½ megohm, enabling the use of conventional tubes for the amplifiers 60 and 70. Lens 24 serves to also increase the sensitivity of the circuit and provides desirable directional properties. If lens 24 is colored, or if filter 28 is inserted behind 24, the circuit can be made to respond only to certain light frequencies or can be made to not respond to certain light frequencies.

Extremely stable operation is provided by using voltage regulator tube 20 to control the voltage applied to the amplifiers. A special limiting action is provided which prevents the signal output from the cathode follower ever exceeding 6 to 8 volts by connecting the plates of the cathode follower to a voltage divider providing 6 to 8 volts. Should a voltage of over 6 volts be applied to the grid across the resistor 42 the grid would be more positive than the plate, and due to the grid current that would then flow in the high impedance tube circuit, a rise of greater voltage over that of the plate voltage is almost impossible. This feature protects the tube and circuit elements.

It has been found that the so-called dark current of a gas phototube operating at 75 volts is due almost exclusively to surface leakage and leakage through its base, so a special guard circuit was devised to control any leakage between the anode and cathode. A special phototube having the anode and cathode insulated by glass to give a long surface leakage path is used, and a conducting surface between the terminals is connected to ground thereby causing any leakage across the tube surface to go, not to the cathode, where it would act as a signal, but to the ground. In the base for the phototube, a similar conducting strip is employed to prevent leakage between the socket terminals of the phototube. The lead connecting the cathode of the phototube to the grid of the cathode follower is shielded by a grounded shield, thus, any stray pick-up is avoided in this line and leakage from high voltage points to the grid through this wire is avoided. The shield is not always necessary for proper operation depending upon the length of line 37.

Should it be desired to slow down the operation of the circuit and put a time lag in the operation, this can readily be done by connecting a condenser 41 in parallel with resistor 42. This condenser resistor combination has an unpredictable time constant in combination with the phototube 34. If a strong light signal suddenly strikes the phototube, condenser 41 will be charged quickly and its delay action will be fast. If the light signal is suddenly removed from the phototube, condenser 41 will discharge rather rapidly through resistor 42, but if the light signal is decreased slightly, the condenser will provide a time delay, slowing up the action of the circuit for either a slight increase or a slight decrease in light. Condensers 41 and 51 may be omitted if rapid response is desired.

Referring to Fig. 2, an alternate relay detector circuit is shown which can be connected in place of the one shown in Fig. 1. In this circuit resistors 92 and 93 replace coils 83 and 84 respectively, line 27A connects to line 27, 81A connects to line 81, and 82A connects to line 82. A relay coil 94 is connected in series with a rectifier 95 from point 96 to point 97 between lines 81A and 82A. The armature 99 of relay 94 is held as by spring 98 on contact 100 and when the relay is actuated it is pulled from contact 100 to contact 101, line 87A connects to armature 99, line 88A connects to contact 101, and line 89A connects to contact 100. Operation of this circuit is similar to that of Fig. 1. With no signal the current through resistor 92 is less than that of resistor 93. Therefore point 96 will be at a higher potential than point 97 which would tend to cause current to flow through coil 94 and rectifier 95; however, rectifier 95 does not allow current to flow in this direction. When the light signal is increased, the current through resistor 92 causes a greater IR drop across it and as explained in Fig. 1, the current through resistor 93 will be decreased somewhat. This causes the voltage at point 97 to be higher than that at point 96, and current flows from point 97 through rectifier 95, coil 94 to point 96, actuating the relay and switching armature 99 from contact 100 to contact 101. The rectifier is inserted so that the relay will not switch at zero light signal, due to current in the opposite direction. Rectifier 95 could be omitted if tubes were tested for balance and adjustment made so that the currents through 92 and 93 were equal with no light signal instead of the current through 93 being larger than that through 92 with no light signal. Operation of all the other parts of the circuits would be identically the same as that in Fig. 1.

Referring to Fig. 3, a third alternative relay detector network is shown. In this network a polarized relay is provided which has a permanent magnet attached to the armature. Line 27B connects to line 27, line 81B to 81, and line 82B to 82. Resistor 102 is thus inserted in the plate circuit of tube 60 and resistor 103 is inserted in the plate circuit of tube 70, polarized relay coil 106 is connected between points 104 and 105, and magnet end 113 becomes a south pole attracting the north pole 112 of the armature 107, thus switching the armature 107 from contact 111 to contact 110. Line 88B connects contact 110, line 87B connects to armature 107, and line 89B connects to contact 111. With no light signal, current flows from point 105 to point 104 which creates a north pole at end 113 repelling the north pole of the armature 112 hence, not switching it. When light strikes the phototube, the voltage at point 105 drops, and current flows from point 104 through coil 106 to point 105 creating a south pole at end 113 which attracts the armatures' north pole at 112, switching armature from contacts 111 to contact 110 with the increase in light.

By proper choice of the resistor in these circuits, an extremely stable circuit with high transconductance can be produced. The cathode follower circuit cathode to ground resistors should be high to decrease the effect of grid emission and increase the stability; however, these circuit resistors can be 1/1000 as large as the grid to ground resistance by connecting the plates of the cathode follower to a low voltage source ionization is practically eliminated. If resistor 29 is inserted in series with the heaters of the cathode follower tubes the grid emission is reduced. The voltage regulator tube provides a stable high voltage reference, both for the phototube and for the amplifier. If voltage regulator tube provides higher than 80 volts, a voltage divider network consisting of resistor 115 and 116 may be used to provide the phototube with its required voltage. Resistor 116 may be replaced by a miniature neon tube. It is highly desirable to mount the cathode follower directly with the phototube in a sealed pick-up unit. A ballast tube may be used in place of dropping resistor 29 to provide a constant heater current. Lines 49 and 59 should be shielded if they are of any length to prevent pick-up being fed into the bridge circuit. Tubes 60 and 70 may be in the same envelope as a twin triode, or tubes 60 and 70 may each be twin triodes or pentodes to secure a high transconductance to make possible the use of a more rugged, cheaper relay.

In all three of the options for the output circuit, the hot side of the source of electrical energy is connected to the armature of the relay and the high beam filaments of an automobile may be connected to the normally closed contacts as by line 89 while the low beam filaments may be connected to the normally open contacts as by line 88. Therefore a light signal can be made to switch the source of electrical energy from the high beams to the low beams and when the light is removed the power will be returned to the high beam filaments.

We are aware that prior to our invention, automatic headlight control devices have been developed which have not proved practical because of the problems of instability and variation in tube and circuit elements. Because of the balanced structure of our circuit and the high grid resistors which we use in our cathode follower circuit, the sensitivity of our circuit is increased 10 to 100 times over that of any other circuit available while still retaining a high degree of stability.

We, therefore, do not claim exclusive invention of an automatic headlight control circuit but rather improvements on the circuit.

We therefore claim:

1. A light actuated control circuit comprising a source of electrical energy, a phototube circuit, a D. C. amplifier comprising a bridge circuit, a cathode follower circuit interposed between said phototube circuit and said D. C. amplifier, a relay driven by said D. C. amplifier, said phototube circuit comprising a phototube and a resistor in series having the phototube anode connected to the positive terminal of said source of electrical energy and having the phototube cathode connected through said resistor to the negative terminal of said source of electrical energy, said cathode follower circuit comprising a vacuum tube having its grid connected to the cathode of said phototube, the vacuum tube plate connected to the positive terminal of said source of electrical energy, and having the cathode thereof connected through a suitable load resistor to the negative terminal of said source of electrical energy, said bridge circuit comprising two vacuum tubes having their plates connected through suitable plate load impedances to the positive terminal of said source of electrical energy, and having their cathode connected through a common resistor to the negative terminal of the said source of electrical energy, while having the control grid of one of them connected to the cathode of said cathode follower, a second cathode follower circuit similar to the first said cathode follower circuit but having connection from its cathode to the control grid of the other said vacuum tube in said bridge circuit, said second cathode follower circuit being effective to balance out any component of voltage in the output of said D. C. amplifier due to the quiescent output voltage of the first said cathode follower circuit and being effective to maintain the improved stability realized by bridging the said D. C. amplifier.

2. The circuit of claim 1 wherein the said relay is connected between the plates of the vacuum tubes of the said bridge circuit and wherein the circuit includes means connected in series with the relay coil such that the relay may be energized only by current flowing in but one given direction through the said coil.

3. The circuit of claim 1 wherein the said relay is a differential relay having two coils, said relay being energized according to the differential between the currents flowing in the two said coils, and each of the two said coils functioning as a means for connecting one of the plates of the vacuum tubes of said D. C. amplifier to the positive terminal of said source of electrical energy.

ROBERT W. BORDEWIECK.
JAMES O. ROEBUCK.
NEAL M. SLEEPER.

REFERENCES CITED

The following references are of record in the file of this patent:

UNITED STATES PATENTS

| Number | Name | Date |
| --- | --- | --- |
| 2,047,127 | Huber | July 7, 1936 |
| 2,090,531 | Hardin | Aug. 17, 1937 |
| 2,249,820 | Gulliksen | July 22, 1941 |
| 2,328,056 | Cooley | Aug. 31, 1943 |
| 2,346,794 | Seeger | Apr. 18, 1944 |
| 2,375,159 | Wills | May 1, 1945 |
| 2,433,559 | Gieseke | Dec. 30, 1947 |
| 2,441,568 | Finison | May 18, 1948 |
| 2,463,985 | Linde | Mar. 8, 1949 |
| 2,464,074 | Cranch | Mar. 8, 1949 |
| 2,471,449 | Reades et al. | May 31, 1949 |
| 2,516,181 | Bruene | July 25, 1950 |

OTHER REFERENCES

The Radio Amateur's Handbook, 1945 edit., page 180.